Feb. 20, 1940.  F. G. RAWLING  2,190,644
TREATMENT OF SOY BEAN MEAL BY FERMENTATION
Filed June 16, 1937
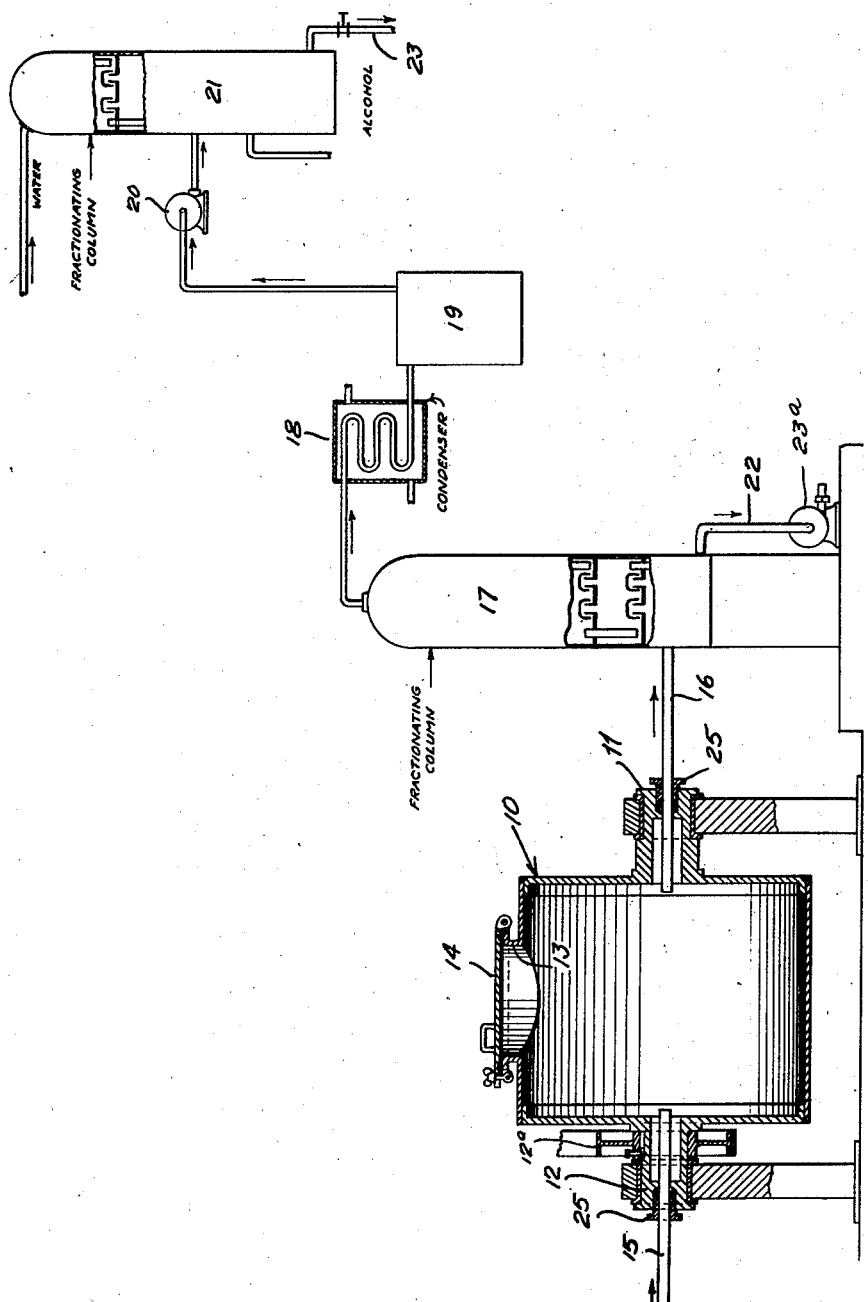
INVENTOR
FRANCIS G. RAWLING
BY
ATTORNEY Patented Feb. 20, 1940

2,190,644

UNITED STATES PATENT OFFICE 2,190,644

TREATMENT OF SOY BEAN MEAL BY FERMENTATION

Francis G. Rawling, Piedmont, W. Va., assignor to West Virginia Pulp & Paper Company, New York, N. Y., a corporation of Delaware Application June 16, 1937, Serial No. 148,435

3 Claims. (Cl. 195—5)

My present invention relates to treatment of soy beans for the purpose of deriving values therefrom. Three important constituents of soy beans are oil, carbohydrates mostly in the form of soluble sugars, and protein. The extraction of the oil from the meal is relatively simple, and satisfactory results are obtained either by pressing or by extraction with an oil solvent. Having freed the meal of the oil content, the problem of separating the soluble carbohydrate constituent which runs around 30% from the protein and obtaining the protein in a relatively pure state is a much more difficult one, especially since many factors such as more than moderate heat, strong acids and alkalis, or repeated precipitations of the protein substance from solutions in either acid or alkali containing same, result in the degradation of the protein with impairment of many of its useful properties.

I have now discovered that a satisfactory separation of the carbohydrate from the protein of the substantially oil-free soy bean meal with recovery of useful products from the carbohydrate may be accomplished by fermentation of the carbohydrate under conditions which will convert substantially all of the same into useful products with no impairment of the protein which is thereby obtained in a highly concentrated form.

My invention will be best understood by reference to the following detailed example illustrative thereof taken with the annexed drawing showing a preferred form of apparatus which may be used in carrying out the process according to said example.

Soy beans are crushed and treated for the removal of oil in known manner as by pressing, or (which may be preferable) by the use of a volatile solvent such as hexane or dichlorethane. The substantially oil-free bean material is then introduced into a mixing apparatus as exemplified by the drum 10 of the drawing. Drum 10 is mounted on preferably hollow horizontal journals 11 and 12 and is provided with means, including pulley 12a, for rotating same.

A charge of 10,000 pounds of the oil extracted soy bean meal is now placed in the drum through the opening 13 having a cover 14, and from 5,000 to 8,000 pounds water containing 200 to 250 pounds sulfuric acid (or its equivalent in other acids such as hydrochloric) are added so that upon thorough mixing the pH value of the mix will be around 4.8 or so. A large part of the water and acid is absorbed by the meal which swells in bulk, and most of the acid is neutralized by the inorganic constituents of the bean. The addition of 50 pounds of secondary ammonium phosphate as a nutrient for the yeast may be added. A thin paste of 100 pounds of yeast in 2500 pounds of water is now added and the drum closed with the cover 14. Fermentation is allowed to proceed at temperatures around 75–85° F. for 24–48 hours, during which time the drum is rotated continuously or at intervals to mix the contents. After fermentation has ceased, which may be judged by the cessation of evolution of carbon dioxide, steam is admitted to the drum 10 by pipe 15 and the contents of the drum heated while rotation is continued. The alcohol vapor and steam are withdrawn through pipe 16 through which they are passed to column still 17 and thence to condenser 18. If desired, the column 17 may be omitted with the production of a more dilute alcohol. Water is withdrawn from the column still by pipe 22 as by pump 23a. This water contains a small amount of alcohol and may be used for the treatment of a succeeding batch of soy bean material by fermentation. The alcohol and water vapors condensing in the condenser 18 are led to a storage tank 19 and the residual gases are exhausted through vacuum pump 20. The vacuum pump is preferably of a size sufficient, if necessary, to provide a vacuum as high as 28 inches of mercury throughout the drum 10, column still 17, condenser 18 and tank 19. Exhaust gases expelled by the pump 20 may be scrubbed in a tower 21, down which flows water in countercurrent to the gases. The water leaving this tower by pipe 23 may also be employed in the fermentation of succeeding batches of soy bean flour to recover the traces of alcohol it contains.

Journals 11 and 12 of the drum 10 are desirably provided with glands 24—25, respectively, so that the drum may be rotated without loss of vacuum. The temperature of the contents of the drum may best be regulated by the amount of vacuum maintained during the addition of steam and the removal of alcohol. Thus, a vacuum of 15 inches of mercury will result in a temperature of around 170–180° F., while one of 28 inches will result in a temperature of around 110° F. In this way the soy bean material can be heated to any desired temperature between 110° F. and 212° F. during the removal of the alcohol, so that the protein in the meal will not suffer excessive deterioration of adhesive properties when it is subsequently extracted from the alcohol-free material.

The substantially alcohol and carbohydratefree meal containing now a high percentage, e. g., 60%, of protein may now be treated for the recovery of the protein. A preferred manner of doing this is as follows: The protein enriched meal is washed with an acid having no specific action on the protein, such acid being of a concentration substantially of pH=4.5 to 4.2, although a somewhat wider range, as for example from 4.8 to 4.2, may be employed. The protein is relatively insoluble in this concentration of acid, whereas the mineral constituents and coloring material, etc., are dissolved thereby, leaving the protein behind in a comparatively pure state. For preparing an adhesive suitable for the manufacture of coated paper, it suffices to dissolve the protein in dilute alkali, e. g., a 2% NaOH solution, the solution so obtained clarified by mechanical means, as by centrifuging, and used directly as a coating color adhesive.

The dilute alcohol collected in the storage tank 19 may be rectified in the usual way to form 95% alcohol, or dehydrated to produce anhydrous alcohol.

Other types of fermentation, e. g., to acetone, butyl alcohol, etc., may be employed upon using the appropriate organisms, provided, however, that the following conditions are satisfied: (1) the fermentative action must not deteriorate the protein; (2) the temperatures involved either in the fermentation or in the removal of the products of the fermentation be below the point at which the protein is unduly degraded. Preferably the temperature of fermentation is not above 60° C., although for short periods the distillation temperature may reach 100° C., it being desirable to keep both temperatures as low as practicable. It will be noted that in accordance with the foregoing example, the amount of water added is comparatively small, being less than the weight of the soy bean meal started with. By so keeping down the amount of water added, the removal and recovery of the alcohol are facilitated.

I wish it to be understood that I do not desire to be limited to the exact details of operation shown and described, for obvious modifications will occur to a person skilled in the art.

I claim:

1. In the manufacture of protein from soy beans, the method of preparing a purified soy bean residue of high protein content, said method comprising the steps of subjecting soy bean meal from which the oil has been extracted, to the action of yeast to convert the contained sugars into alcohol and carbon dioxide, removing the alcohol from the unfermented residue by steaming the same under applied vacuum as will prevent a rise in temperature substantially in excess of 85° C. as would result in substantial degradation of the protein.

2. In the manufacture of protein from soy beans, the method of preparing a purified soy bean residue of high protein content, said method comprising the steps of subjecting soy bean meal from which the oil has been extracted, to the action of yeast to convert the contained sugars into alcohol and carbon dioxide, removing the alcohol from the unfermented residue by steaming the same under applied vacuum as will prevent a rise in temperature substantially in excess of 85° C. as would result in substantial degradation of the protein, and washing the obtained residue with dilute acid of a pH of 4.2–4.8.

3. In the manufacture of protein from soy beans, the method of preparing a purified soy bean residue of high protein content, said method comprising the steps of subjecting soy bean meal from which the oil has been extracted, to the action of yeast while tumbling same in a closed container to convert the contained sugars into alcohol and carbon dioxide, removing the alcohol from the unfermented residue by steaming the same under applied vacuum as will prevent a rise in temperature substantially in excess of 85° C. as would result in substantial degradation of the protein.

FRANCIS G. RAWLING.